US005214458A

United States Patent [19]

Kanai

[11] Patent Number: 5,214,458

[45] Date of Patent: May 25, 1993

[54] DISPLAY APPARATUS

[75] Inventor: Hiromi Kanai, Tokyo, Japan

[73] Assignee: Matsubara Kenki Kogyo Kabushiki Kaisha, Japan

[21] Appl. No.: 914,338

[22] Filed: Jul. 16, 1992

[30] Foreign Application Priority Data

Jan. 14, 1992 [JP] Japan .............................. 4-10412[U]

[51] Int. Cl.[5] .............................................. G03B 21/08

[52] U.S. Cl. ........................................ 353/63; 353/65; 353/28; 353/DIG. 4

[58] Field of Search ....................... 353/65, 67, 63, 66, 353/28, DIG. 4, 29; 434/394

[56] References Cited

U.S. PATENT DOCUMENTS 3,293,982 12/1966 Appeldorn .................. 353/DIG. 4

4,735,500 4/1988 Grunwald .................... 353/DIG. 4

4,943,156 7/1990 Vanderwetf .................. 353/DIG. 4

4,986,651 1/1991 Vanderwerf ................. 353/DIG. 4

*Primary Examiner*—William A. Cuchlinski, Jr.
*Assistant Examiner*—William C. Dowling
*Attorney, Agent, or Firm*—Kinzer, Plyer, Dorn, McEachran & Jambor

[57] ABSTRACT

In order to provide a display apparatus which can express projected images of small characters, illustrations or the like in not only the daytime or an illuminated bright place, but also the nighttime in the case where brightness is deficient, besides which can be used in not only the outdoors, but also the inside of a dark room, the present display apparatus comprises a mirror Fresnel lens, an original picture for projection positioned over the surface of the mirror Fresnel lens, and a projection mechanism positioned on the surface side of the mirror Fresnel lens and at the same time, disposed so as to emit light on the surface of the mirror Fresnel lens, further the light emitted from the projection mechanism being reflected by the mirror Fresnel lens to project an image of the original picture for projection on a prescribed plane of projection.

4 Claims, 5 Drawing Sheets

DISPLAY APPARATUS

BACKGROUND OF THE INVENTION

1. Field of the Invention

The present invention relates to a display apparatus, and particularly to a display apparatus which can call viewers' visual attention by projecting commercial images, background images or the like on the surface of a wall, ceiling or the like.

2. Description of the Related Art

Fundamentally speaking, a display apparatus is an apparatus for sending a message or the like to people by stimulating their curiosity. From this point of view, it could not have been said that a mere printed paper, a plane billboard and the like function efficiently.

As a display apparatus which supplies such deficient points as described above, the one which intends to stimulate people's vision by the use of moving images, the one which utilizes such stimulation caused by a combination of moving images and sounds, and further the one which is constructed in such that moving images are used, besides such images are once produced and then extinguished, thus such actions are repeated, whereby it calls viewer's attention have been known.

There was, however, such a problem in that all the display apparatuses as described above and which have been known heretofore were used in an atmosphere in which sufficient brightness is kept, thus such display apparatuses could not attain their efficient functions as the one for using in the nighttime where there is no illumination.

On the other hand, as a display apparatus which has eliminated the problem as described above, the one which utilizes a neon sign in darkness of the nighttime has been employed. However, it is impossible to express images of small characters, illustrations and the like by the use of neon sign, so that there was such a problem in that the above described display apparatus utilizing neon sign was not satisfied also as media for advertisement and publicity for effectively communicating sponsor's intention.

Furthermore, there has been no suitable display apparatus which can be used in a narrow space, more specifically a dark room. Moreover, there was such a problem in that such type of a display apparatus which participates in not only achievement of functions in advertisement and publicity, but also creation of a distinctive indoor atmosphere has never been proposed heretofore.

OBJECTS AND SUMMARY OF THE INVENTION

The present invention has been made in view of the problems involved in the prior art and an object of the invention is to provide a display apparatus which can express projected images of small characters, illustrations or the like in not only the daytime or an illuminated bright place, but also the nighttime in the case where brightness is deficient. Besides, the display apparatus of the present invention can be used in the outdoors, the interior of a building which is a narrower place than that of the outdoors, and further the inside of a dark room.

Furthermore, another object of the present invention is to provide a display apparatus suitable for combining with a projection type timepiece which indicates a certain time by projecting the images of a clock dial and hour and minute hands on the surface of a wall or ceiling to obtain such clear projected images.

Yet further, another object of the present invention is to provide a display apparatus suitable for combining with a projection type timepiece, the display apparatus of which can be used in a bright room, and which is arranged so as to obtain clear and correct images by the use of a small electric power irrespective of the shape in a wall surface or ceiling, besides which functions also as a desk-lamp.

In order to attain the above described objects, the display apparatus according to the present invention comprises a mirror Fresnel lens, an original picture for projection which is positioned over the surface of the mirror Fresnel lens, and a projection mechanism which is positioned on the surface side of the mirror Fresnel lens and arranged simultaneously so as to illuminate the surface of the mirror Fresnel lens; the light emitted from the projection mechanism being reflected by the mirror Fresnel lens thereby to project an image of the original picture on a prescribed plane of projection.

Because of illumination by means of the projection mechanism, the light emitted passes through the original picture for projection to form projecting light. This projecting light is reflected by the mirror Fresnel lens, whereby a certain image is projected on the prescribed plane of projection. As a result, even in the nighttime or a dark room, images of small characters, illustrations and the like drawn as the original picture for projection can be projected on the surface of a wall, ceiling or the like of the plane of projection to express the clear images. Accordingly, it is possible to easily call viewers' attention and at the same time, to create a distinctive atmosphere in a room by expressing images on the surface of wall, ceiling or the like for the purpose of interior decoration.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the display apparatus according to the present invention will be described in detail hereinbelow in conjunction with the accompanying drawings.

Figure 1:
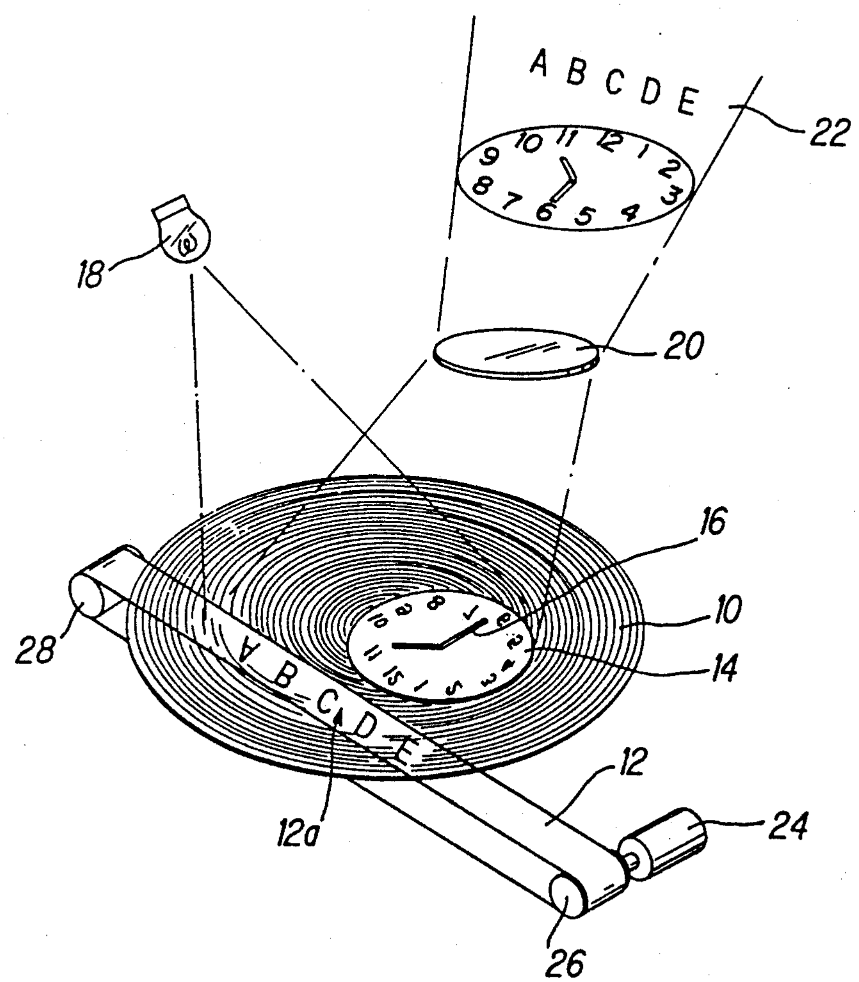
FIG. 1 is an explanatory view for a schematic construction of the first embodiment of the display apparatus according to the present invention.

FIGS. 1 through 4 show the first embodiment of the display apparatus according to the present invention wherein FIG. 1 shows the schematic construction of the display apparatus.

The display apparatus according to the present invention is arranged in such that an original picture to be projected 12a is expressed at a position putting out of the center from a mirror Fresnel lens 10. The display apparatus is provided with a film 12 in an endless form, a clock dial 14, and hour and minute hands 16. In the display apparatus, such projecting light produced by passing the light for illumination supplied from a lamp 18 through the film 12 is reflected by the mirror Fresnel lens 10, the reflected light is projected on the surface of a wall 22 through a projection lens 20 to project the image of the original picture for projection 12a, and further the images of the clock dial 14 and the hour and minute hands 16 are projected on the wall surface 22 by the same manner as that described above. Thus, the images of the projecting original picture 12a as well as the hour at that time expressed by the clock dial 14 and both the hands 16 are displayed on the wall surface 22 in expanded projection.

Figure 2:
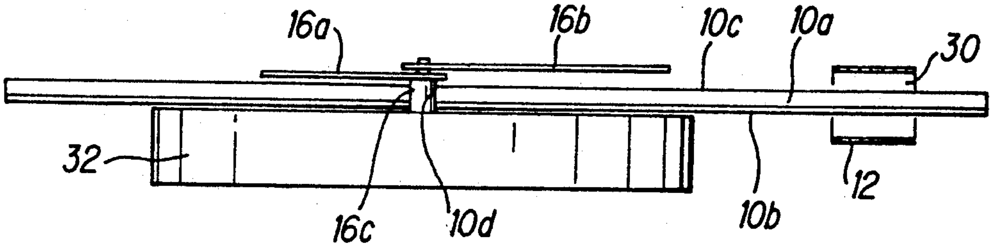
FIG. 2 is a side view, partially in section, of an essential part of the display apparatus shown in FIG. 1.
Figure 3:
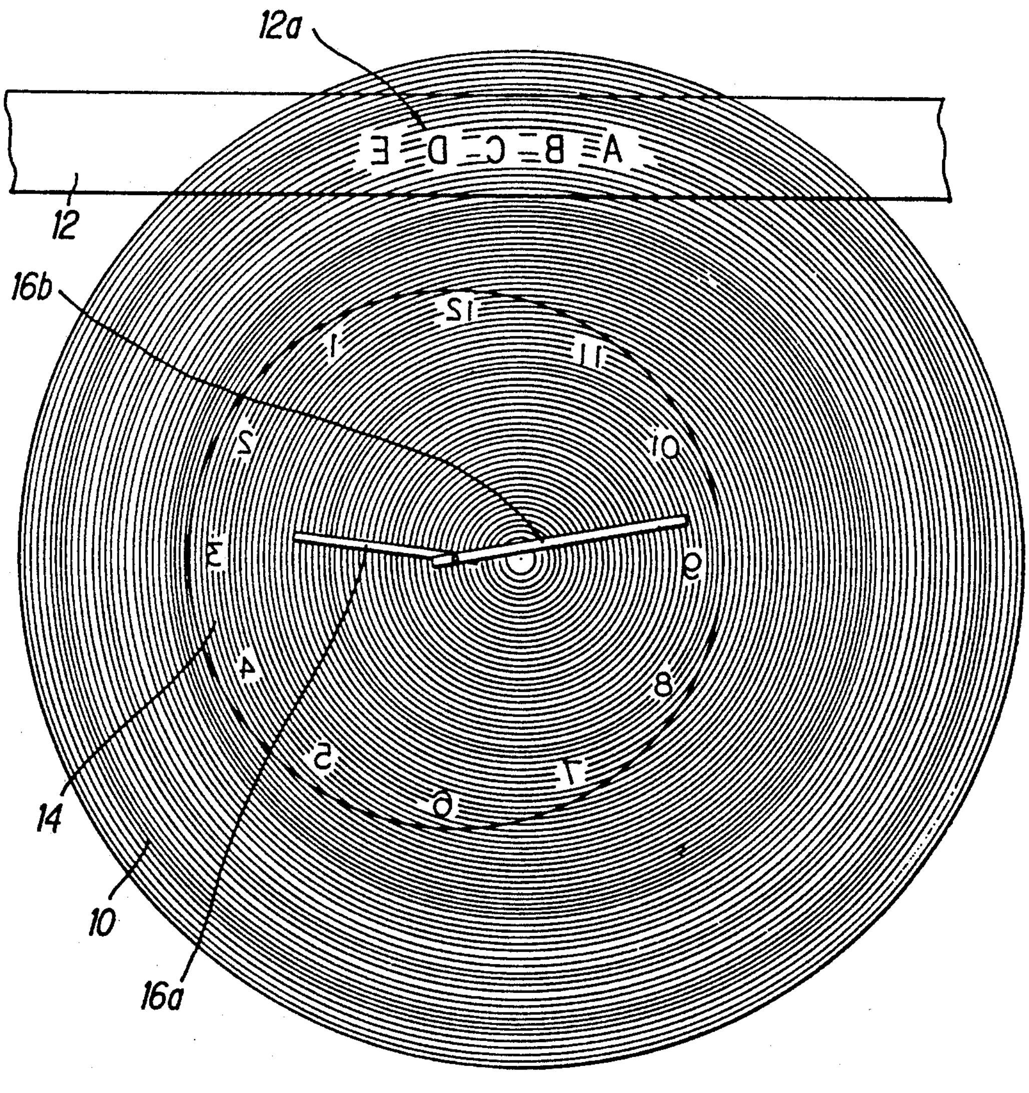
FIG. 3 is a plan view showing the essential part of the display apparatus of FIG. 1.
Figure 4:
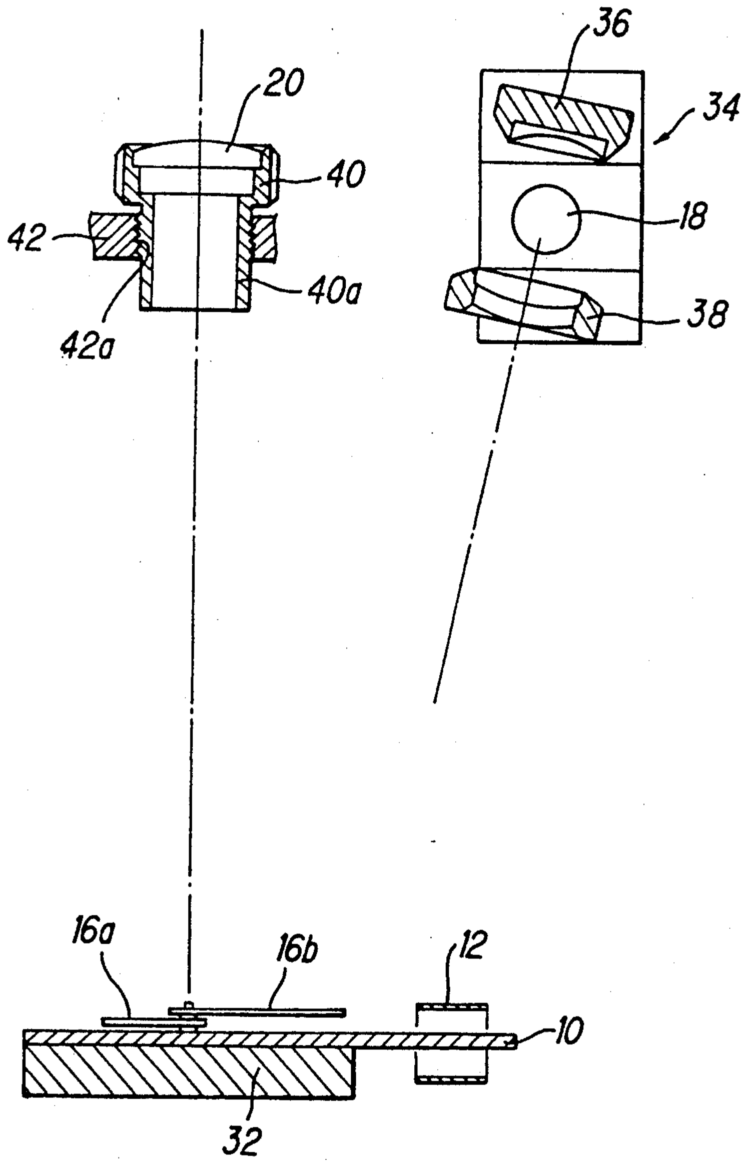
FIG. 4 is an explanatory view showing an arrangement of a projection mechanism and a projecting lens.

The mirror Fresnel lens 10 is arranged, as shown in FIG. 2, in such that the side of grooves 10a of the Fresnel lens is formed into a mirror surface 10b by aluminizing the groove side, and at the same time the surface 10c, i.e. reflecting surface of the mirror Fresnel lens is formed into a flat surface.

On the film 12, characters and/or figures for an advertisement and publicity are expressed in optionally colored manner, or illustrations or the like for creating a distinctive atmosphere are printed as the original picture for projection 12a. Further, the transparent or translucent film 12 is endlessly extended between a driving roller 26 driven by a motor 24 and a driven roller 28. In this construction, when the driving roller 26 is rotated by the motor 24 at a predetermined speed, the film 12 is delivered at the predetermined speed.

Moreover, the driving roller 26 is arranged so as to be possible to deliver intermittently the film 12 at a given cycle or to deliver the same continuously at a slow speed, so that such intermittent or continuous delivery may be selected in accordance with a type of the projecting original picture 12a to be expressed on the film 12.

The above described mirror Fresnel lens 10 is disposed in such a manner that the back of the film 12 is closely adjacent to the surface 10c of the mirror Fresnel lens 10 in a space 30 defined between the two-stepped film 12 extended between the driving roller 26 and the driven roller 28. Furthermore, the central portion of the projecting original picture 12a on the film 12 is disposed at a position somewhat out of the center of the mirror Fresnel lens 12, in other words, the projecting original picture 12a is in a so-called eccentric placement.

On the surface 10c of the mirror Fresnel lens 10, as shown in FIGS. 1 through 4, timepiece's hands 16 consisting of a short hand (or hour hand) 16a and a long hand (or minute hand) 16b made of a transparent, translucent or impermeable material and the like are placed. These hands 16 are attached to a rotating shaft 16c extended through an opening 10d bored in the mirror Fresnel lens 10 at a position somewhat out of the center thereof.

Furthermore, on the surface 10c of the mirror Fresnel lens 10, provided is the clock dial 14 made of a transparent or translucent material and the like and on the surface of which are expressed hourly numerals from 1 to 12 representing the respective hours of the timepiece along the rotating locus of the hands 16 in a reversed manner. On the other hand, on the reverse side of the mirror Fresnel lens 10, disposed is a clock movement 32 connected to the rotating shaft 16c of the aforesaid hands 16 to operate the same in counterclockwise direction.

Moreover, a projection mechanism 34 for illuminating the mirror Fresnel lens 10 is placed over the side of the surface 10c of the mirror Fresnel lens 10. The light emitted from the projection mechanism 34 passes through the film 12, the clock dial 14 and the hands 16, and then reflected by the surface 10c of the mirror Fresnel lens 10 to be projected enlargedly on the wall surface 22 through the projector lens 20.

The projection mechanism 34 comprises the lamp 18 as a light source, a reflecting mirror 36 for reflecting such light and disposed behind the lamp 18, and a condenser lens 38 for condensing the light and applying the light so condensed to the mirror Fresnel lens 10. These components, i.e. lamp 18, reflecting mirror 36, and condenser lens 38 are placed by means of a suitable means with such a positional relationship that a line obtained by connecting the respective centers of the above described components to each other is directed to the projecting original picture 12a on the film 12 disposed over the mirror Fresnel lens 10 and the rotating shaft 16c of the hands 16, in other words, the light emitted from the projection mechanism 34 illuminates the mirror Fresnel lens 10 centering about the projecting original picture 12a and the rotating shaft 16c of the hands 16.

The projection lens 20 for enlargedly projecting images of the projecting original picture 12a, the clock dial 14 and the hands 16 on the wall surface 22 are placed on the side of the above described projection mechanism 34 and on lines extended from the central portions of the projecting original picture 12a and the rotating shaft 16c of the hands 16. The projector lens 20 is mounted on a holder 40 having a cylindrical section 40a on a portion of which is circumferentially provided a male screw. The holder 40 is attached in a retractable manner to an opening 42a having a female screw to be engaged threadedly with the aforesaid male screw provided on a supporting plate 42, whereby a focal adjustment of the apparatus can be effected.

As mentioned above, in the present embodiment, while the centers of the projecting original picture 12a of the film 12 and the rotating shaft 16c of the hands 16 are disposed eccentrically from the center of the mirror Fresnel lens 10, and simultaneously the projector lens 20 is placed on the lines extended from the central portions of the projecting original picture 12a and the rotating shaft 16c of the hands 16, modifications may be made in such that the rotating shaft 16c of the hands 16 is disposed on the center of the mirror Fresnel lens 10, or the projecting original picture 12a of the film 12 is placed on the center of the mirror Fresnel lens 10. In these cases, it is preferred that the projection mechanism 34 and the projector lens 20 are symmetrically disposed at a prescribed angle with respect to a vertical line extended from the center of the mirror Fresnel lens 10.

In the above described construction, when the lamp 18 of the projection mechanism 34 is energized, the lamp 18 lights up. The light of the lamp 18 falls on the mirror Fresnel lens 10 through the condenser lens 38 centering about the projecting original picture 12a of the film 12 and the rotating shaft 16c of the hands 16. The reflected light from the mirror Fresnel lens 10 is projected through the projector lens 20 together with the images of the projecting original picture 12*a* of the film 12, the clock dial 14 and the hands 16, so that these images are imaged on the plane of projection in the wall surface 22, whereby the original picture for projection 12*a* and the time are displayed. In this case, when the projected images are out of focus, the focus of the projector lens 20 may be adjusted by extending or retracting the holder 40.

Figure 5:
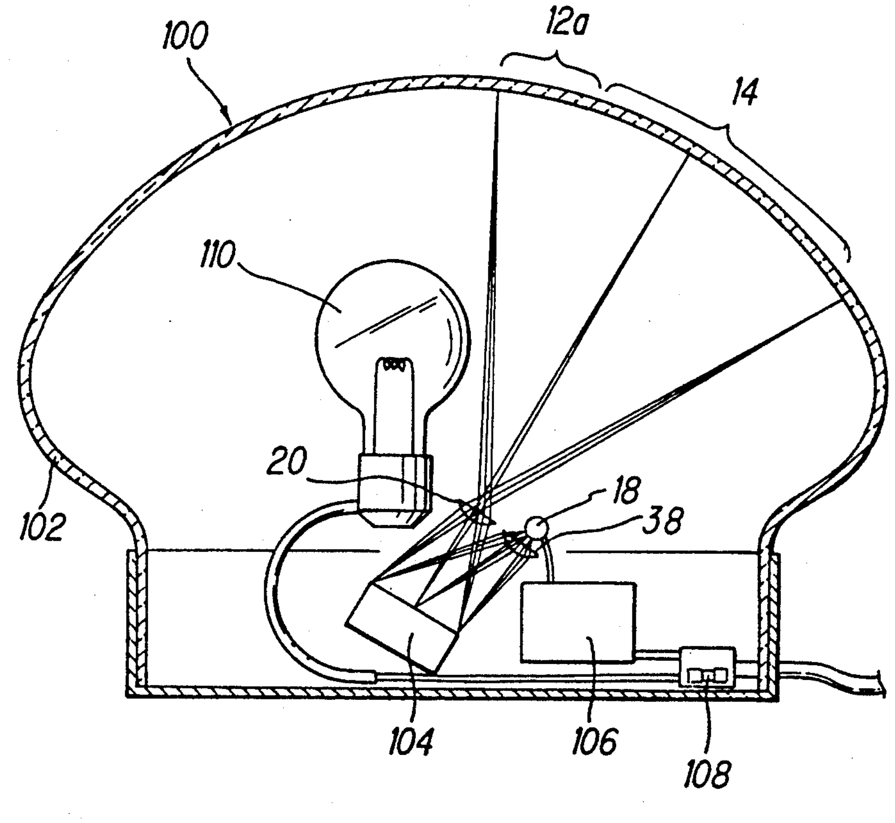
FIG. 5 is an explanatory view, in section, for a schematic construction showing the second embodiment of the display apparatus according to the present invention.
Figure 6:
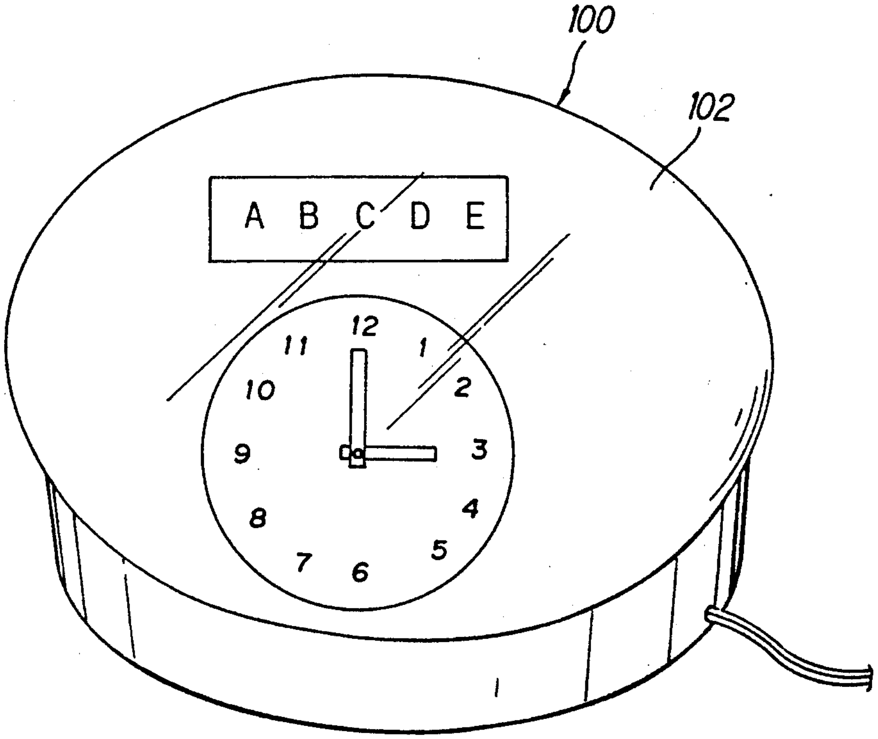
FIG. 6 is an explanatory view illustrating a display mode of the second embodiment of the invention.

FIGS. 5 and 6 show the second embodiment of the display apparatus according to the present invention wherein the same or like parts are designated by corresponding reference characters of the first embodiment, and the detailed description therefor will be omitted.

While the first embodiment is constructed in such that the images of the projecting original picture 12*a* of the film 12 and time are projected on the wall surface 22, a ceiling or the like which is distant from the display apparatus, the second embodiment is constructed by a different manner from the first embodiment in that the images of an original picture and a time are projected on a cover for the display apparatus such as a shade for desk-lamp or the like which covers around the light source of such luminous source device. More specifically, as shown in FIGS. 5 and 6, the display apparatus of the second embodiment is constructed in such that the images of an original picture for projection 12*a* in a film 12 and a time are projected on the inside surface of a spherical shade 102 for a desk-lamp 100, so that the projected images of the original picture for projection 12*a*, the time of a timepiece and the like can be viewed on the outside surface of the shade 102.

In the second embodiment as described above, a mirror Fresnel lens 10, the film 12, a motor 24 being a driving system for the film 12, a driving roller 28, a driven roller 30 and the like are contained in a container section designated by reference numeral 104, and at the same time a lamp 18 is controlled by means of a control mechanism 106. It is to be noted in the second embodiment that characters and the like expressed on the film 12 as the original picture for projection 12*a* are not indicated in a reversed manner, besides numbers 1 through 12 representing hours drawn on a clock dial 14 expressed on the surface 10*c* of the mirror Fresnel lens 10 are ordered in clockwise direction, and a clock movement 32 rotates hands 16 in clockwise direction.

Reference numeral 108 in FIG. 5 designates a switch for switching a light source 110 of the desk-lamp 100.

According to the second embodiment described above, in comparison with the first embodiment wherein images are projected on the surface of a wall or ceiling, a selection of the place for projection is not required, besides a distance reaching the plane of projection is short, so that an output of the lamp 18 can be reduced, whereby the lamp 18 of small power consumption may be used. As a result, generation of heat can be suppressed in the display apparatus of the second embodiment.

In the above described respective embodiments, while a type of the display apparatus is the one in which the projected light after having passed through the film 12 is reflected by the surface 10*c* of the mirror Fresnel lens 10, it may be such type of the display apparatus that the light emitted from a light source is arranged to be once reflected by the surface of a mirror Fresnel lens, the light thus reflected is made to pass through the projecting original picture 12*a* of the film 12, and the light thus passed through is made to project on the surface of a wall or ceiling, or a shade for desk-lamp and the like through the projector lens 20.

While the surface of a wall or ceiling, or a shade for desklamp and the like have been described above as a place for projection of the projecting original picture 12*a* expressed on the film 12, images may be projected on an object having an indeterminate shape such as curtain, tent, cloth, human body or the like, and when such a place as described above is selected as the plane of projection, the projecting original picture 12*a* is displayed with deformation effects so that such images can call viewers' attention further, and hence such projection of the original picture and the like is extremely effective as media for advertisement and publicity.

In the above respective embodiments, while the hands 16 consist of a short hand 16*a* and a long hand 16*b*, a second-hand may be added thereto as a matter of course.

Furthermore, in the above embodiments, it is also possible to elevate further the designing effects of a projected image by preparing the original picture for projection 12*a* with the use of a color film, forming the clock dial 14, the hands 16 and the like from colored transparent plastics, or attaching a color filter to the projector lens 20.

Moreover, a driving system such as the mirror Fresnel lens 10, the film 12, the motor 24 and the like; a time display mechanism such as the clock movement 32, the hands 16 and the like; the projection mechanism 34; the projector lens 20 and the like in the above described respective embodiments may be integrally constructed in a housing as a unit type display apparatus. This unit is swingably attached to a base plate, whereby a place for projection may easily be changed by transferring the base plate.

In addition, the shade for desk-lamp in the second embodiment is not limited to a spherical profile, but it may be constructed in a box type shade and one side of which may be used as the plane for projection.

Since the present invention has been constructed as described above, the advantages enumerated are as follows:

An original picture for projection expressed on a film or the like is reflectively projected with the light reflected from a light source by employing a mirror Fresnel lens, besides this film is arranged to be fed continuously or intermittently thereby to display images on the surface of a wall or ceiling, a shade for desk-lamp or the like, so that such display functions effectively for advertisement or publicity, or creation of a distinctive atmosphere, whereby the display can call viewers' attention even in a comparatively narrow and dark space.

Furthermore, a wall surface, ceiling or the like can be easily utilized as media for advertisement and publicity without any additional modification, such display according to the display apparatus of the present invention can be used as the one for not a lasting, but tentative gathering, for example, a provisional event and the like.

Moreover, the display apparatus according to the present invention can simply be set even in a narrow place without particular consideration for selecting a setting place of the display apparatus, besides the display apparatus of the invention can also be transferred in a simple manner because of the simple construction thereof. Accordingly, the total cost relating to setting, transfer and the like of the display apparatus can be suppressed.

Still further, in the display apparatus according to the present invention, a dimension of the image to be projected can be varied in accordance with necessity by adjusting a projector lens, or adjusting a dimension of a mirror Fresnel lens or an original picture for projection.

Yet further, since a small original picture is prepared as the one for projection, and this small original picture is expansively projected in the display apparatus according to the present invention, there is no need of field installation unlike a conventional exchange of billboards. On the contrary, exchange of an original picture for changing the image to be projected can simply be effected by any person in the display apparatus of the present invention, besides cost for preparing such original picture for projection can be suppressed in a low level.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A display apparatus comprising a mirror Fresnel lens;

an original picture for projection positioned over the surface of said mirror Fresnel lens;

hands disposed over said mirror Fresnel lens;

hourly numbers in a clock dial which are disposed along the rotating locus of said hands on the surface of said mirror Fresnel lens;

a clock movement placed on the back side of said mirror Fresnel lens to drive said hands; and a projection mechanism positioned on the surface side of said mirror Fresnel lens and at the same time, disposed so as to emit light on the surface of said mirror Fresnel lens; the light emitted from said projection mechanism being reflected by said mirror Fresnel lens to project images of said original picture for projection, said hands and said clock dial on a prescribed plane of projection.

2. A display apparatus as claimed in claim 1 wherein said original picture for projection is transferable on the surface of said mirror Fresnel lens.

3. In the inside of a desk-lamp provided with a light source for illumination and a cover for covering around said light source, a display apparatus comprising a mirror Fresnel lens;

an original picture for projection positioned over the surface of said mirror Fresnel lens;

hands disposed over said mirror Fresnel lens;

hourly numbers in a clock dial which are disposed along the rotating locus of said hands on the surface of said mirror Fresnel lens;

a clock movement placed on the back side of said mirror Fresnel lens to drive said hands; and a projection mechanism positioned on the surface side of said mirror Fresnel lens and at the same time, disposed so as to emit light on the surface of said mirror Fresnel lens; the light emitted from said projection mechanism being reflected by said mirror Fresnel lens to project images of said original picture for projection, said hands, and said clock dial on the interior surface said cover.

4. A display apparatus as claimed in claim 3 wherein said original picture for projection is transferable on the surface of said mirror Fresnel lens.

* * * * *

UNITED STATES PATENT AND TRADEMARK OFFICE
CERTIFICATE OF CORRECTION

PATENT NO. : 5,214,458
DATED : May 25, 1993
INVENTOR(S) : Hiromi Kanai

It is certified that error appears in the above-indentified patent and that said Letters Patent is hereby corrected as shown below:

On title page, item [73] "Matsubara Kenki Kogyo Kabushiki Kaisha" should be --Matsubara Denki Kogyo Kabushiki Kaisha--

Signed and Sealed this

Third Day of May, 1994

Attest:

Bruce Lehman

BRUCE LEHMAN

*Attesting Officer*

*Commissioner of Patents and Trademarks*